United States Patent
Riley et al.

(10) Patent No.: US 11,625,338 B1
(45) Date of Patent: Apr. 11, 2023

(54) EXTENDING SUPERVISORY SERVICES INTO TRUSTED CLOUD OPERATOR DOMAINS

(71) Applicant: HEWLETT PACKARD ENTERPRISE DEVELOPMENT LP, Houston, TX (US)

(72) Inventors: Dwight D. Riley, Houston, TX (US); Scott P. Faasse, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/452,790

(22) Filed: Oct. 29, 2021

(51) Int. Cl.
*G06F 13/10* (2006.01)
*G06F 21/82* (2013.01)
*G06F 1/28* (2006.01)

(52) U.S. Cl.
CPC ............ *G06F 13/102* (2013.01); *G06F 21/82* (2013.01); *G06F 1/28* (2013.01)

(58) Field of Classification Search
CPC ........... G06F 13/102; G06F 1/28; G06F 21/82

USPC .......................................................... 710/19
See application file for complete search history.

(56) References Cited

U.S. PATENT DOCUMENTS

| | | | |
|---|---|---|---|
| 10,043,167 B2* | 8/2018 | Hardin | G06Q 20/202 |
| 10,587,535 B2 | 3/2020 | Itkin | |
| 10,698,842 B1* | 6/2020 | Dastidar | G06F 15/7889 |
| 2014/0273955 A1* | 9/2014 | Oesterling | B60R 25/24 |
| | | | 455/411 |
| 2019/0042328 A1* | 2/2019 | Ortega | G06F 9/5055 |
| 2020/0073840 A1 | 3/2020 | Mekad et al. | |
| 2021/0141658 A1* | 5/2021 | Sahita | G06F 21/44 |
| 2021/0168132 A1* | 6/2021 | Smith | H04L 63/105 |

* cited by examiner

*Primary Examiner* — Christopher B Shin
(74) *Attorney, Agent, or Firm* — Trop, Pruner & Hu, P.C.

(57) ABSTRACT

A supervisory service of a node that includes a smart input/output (I/O) peripheral is extended into a cloud operator domain that is associated with the smart I/O peripheral. The supervisory service determines a state of a ready state indicator that is provided by the smart I/O peripheral. Based on the state, the supervisory service performs at least one of regulating an availability of an instance of an application operating environment of the node or determining whether the smart I/O peripheral is ready to be configured by the supervisory service.

20 Claims, 10 Drawing Sheets

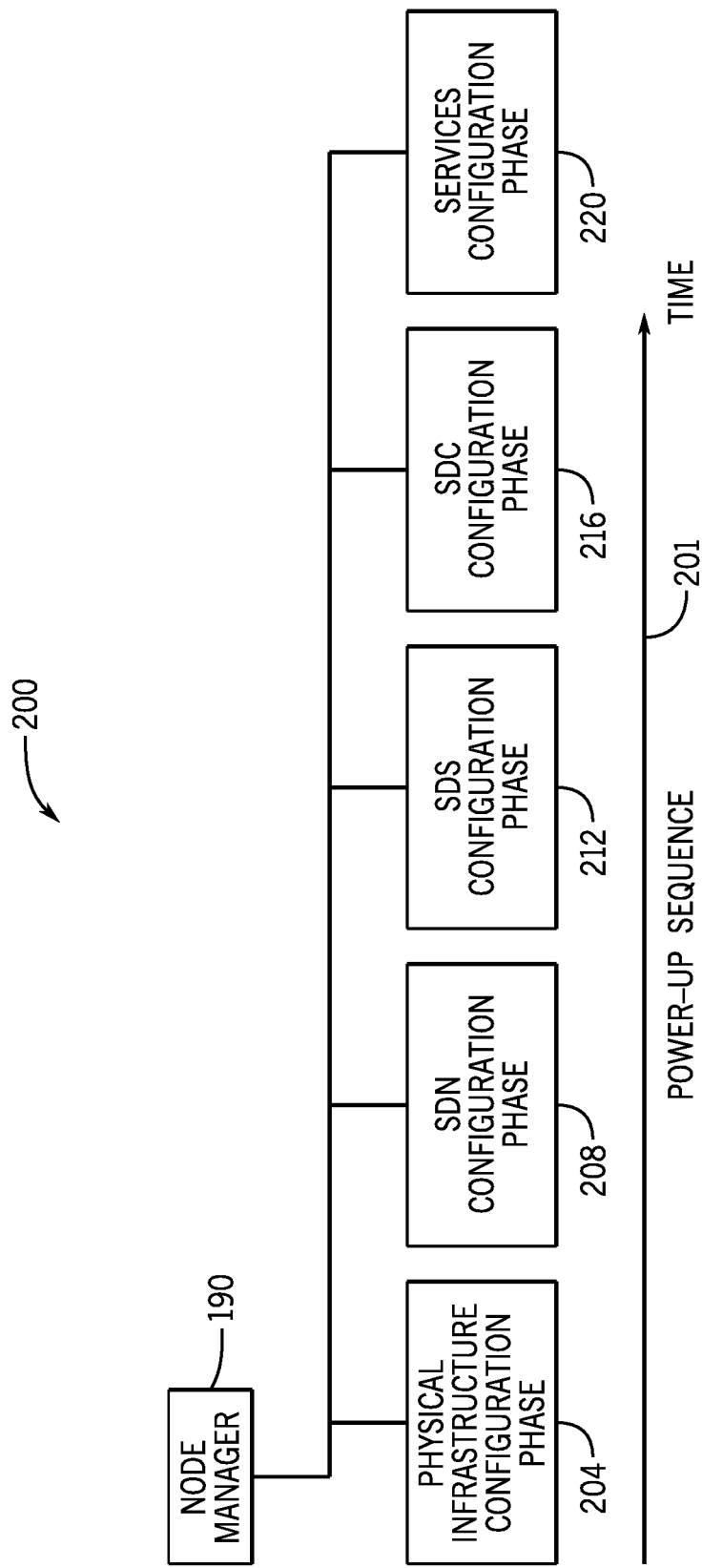

US 11,625,338 B1

EXTENDING SUPERVISORY SERVICES INTO TRUSTED CLOUD OPERATOR DOMAINS

BACKGROUND

A cloud architecture may include a computer system domain of multiple physical server nodes (e.g., blade servers or rack mounted servers), or "domain nodes." The domain nodes define a computer system, physical infrastructure domain. The physical infrastructure domain may be managed by a central management system, which orchestrates a software-defined logical infrastructure and services (e.g. software-defined compute (SDC) services, software-defined storage (SDS) services and software-defined networking (SDN) services), which are hosted on the domain nodes. The software-defined logical infrastructure relies on an abstraction infrastructure layer (e.g., a hypervisor for virtual machine (VM) abstractions or an OS for container abstractions) to provide the central management system control of the services.

BRIEF DESCRIPTION OF THE DRAWINGS

FIG. 2 depicts an example power-up sequence for a smart input/output (I/O) peripheral of a domain node of the cloud computer system of FIG. 1 according to an example implementation.

DETAILED DESCRIPTION

Figure 1:
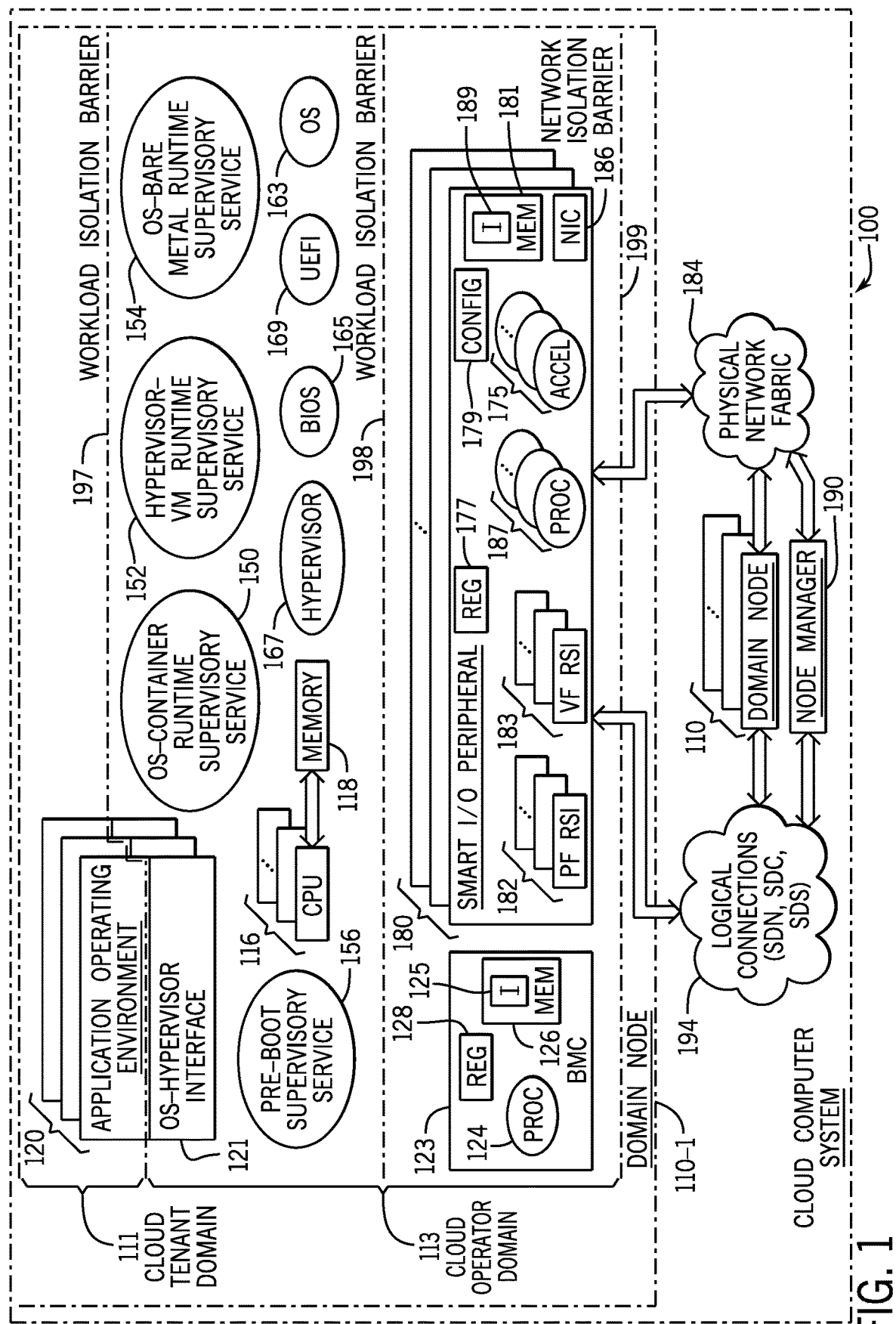
FIG. 1 is a schematic diagram of a cloud computer system according to an example implementation.

A computer platform, such as a server (e.g., a blade server or a rack-mounted server), may have an architecture (e.g., a traditional personal computer (PC)-based architecture, or "legacy architecture") that may be characterized as employing a "host-centric" control model. In the host-centric control model, the server controls are rooted in the host of the server. As used herein, a "host" refers to the software and hardware of the computer platform, which provides one or multiple application operating environments for the computer platform. Stated differently, the server controls are rooted in the main central processing units (CPUs) of the server.

The server may be a compute node of a cloud-based computing system, or "cloud computer system." The software layer of the computer node's host may provide the logical infrastructure abstraction and control surfaces via a hypervisor software stack (for virtual machines (VMs)) and/or an operating system software stack (for containers). The result of this host-centric control model is a separation of the administrative control of the physical infrastructure of the compute node from the logical infrastructure of the compute node.

A central management system of the cloud computer system may be built around a hierarchical management structure. At the lowest level of the hierarchical management structure the compute node may be divided into two distinct control surfaces: a first control surface for the physical infrastructure of the compute node and a second control surface for the logical infrastructure of the compute node. Each of these infrastructures may be connected to its own central manager so that there may be two distinctly different associated administrators: an administrator for the physical infrastructure and a virtualization administrator for the logical infrastructure. Correspondingly, there may be two distinct central management software stacks, and there may be a cloud infrastructure manager at the top of the hierarchical management structure to unify the software stacks. The cloud infrastructure manager may replace the roles of the traditional infrastructure administrator with the following distinct cloud roles: the operator (for physical & logical infrastructure control), the tenant (for abstracted instance control), and the infrastructure support technician (for support).

Cloud-native architectures may look similar to traditional cloud architectures, but cloud-native architectures differ in one significant aspect. Cloud-native architectures blend the physical and logical infrastructure by using intelligent input/output (I/O) subsystems, called "smart I/O peripherals" herein, for purposes of offloading services from the host (i.e., offloading traditional processing performed by the host) and by isolating node management controls within the smart I/O peripherals. The blending of physical and logical infrastructure changes the general-purpose nature of legacy architecture servers by utilizing an independent software stack, which may be managed in segments (e.g., segments aligned to SDC, SDS, and SDN layers). Accordingly, such a server is referred to herein as a segmented server (or "segmented compute node"). This segmented control model presents orchestration and control sequencing challenges for the legacy architecture server related to ensuring that all independent managers are in a "ready state" before backend I/O services provided by the smart I/O peripherals are rendered. This new orchestration and sequencing results in a more vertically-integrated (i.e., tightly-coupled or unified) architecture. While the cloud-native architecture uses a hierarchical control management domain structure, the result is a unified experience around three control roles: the operator, the tenant, and the support technician.

As used herein, a "smart I/O peripheral" refers to a device, or component, of the computer platform, which provides one or multiple functions for the host, which, in legacy architectures, have been controlled by the host. In general, a smart I/O peripheral is hardware processor that has been assigned (e.g., programmed with) a certain personality. The smart I/O peripheral may provide one or multiple backend I/O services (or "host offloaded services) in accordance with its personality. The backend I/O services may be non-transparent services or transparent services. An example of a non-transparent host service is a hypervisor virtual switch offloading service using PCIe direct I/O (e.g., CPU input-output memory management unit (IOMMU) mapping of PCIe device physical and/or virtual functions) with no host control. A host transparent backend I/O service does not involve modifying host software. As examples, transparent backend I/O services may include network-related services, such as encryption services, overlay network access services and firewall-based network protection services. In general, the smart I/O peripheral may provide any of a number of transparent and/or non-transparent backend network services for the host. As examples, network-related backend services may include overlay network services, virtual switching services, virtual routing services and network function virtualization services. As examples, storage-related backend services may include backend storage I/O services for the host, such as storage acceleration services (e.g., non-volatile memory express (NVMe)-based services), direct attached storage services, or a Serial Attached SCSI (SAS) storage service.

A smart I/O peripheral may coordinate with another network component for purposes of providing one or multiple backend I/O services. For example, the smart I/O peripheral may be a "smart NIC" that is connected to an Ethernet Top-of-the Rack (ToR) switch. This combination may provide host isolation by using the smart NIC in its "lock state" for Peripheral Component Interconnect express (PCIe) physical and virtual functions. Here, the "lock state" refers to restricting host access from full reconfiguring capability of the device based on the cloud operator's goals. For example, the lock state may prevent the host from reconfiguring certain infrastructure (e.g., turning off storage redundancy, turning off GPUs, and forth), which might affect, for example, the cloud operator's contractual obligation to the tenant. With this arrangement, the ToR switch may be used to provide such network services as a network protection service (e.g., a firewall service) or an instance overlay service (e.g., a virtual extensible local area network (VxLAN) service).

The smart I/O peripheral may take on one of many different physical forms and provide any of a wide variety of backend I/O services. A given smart I/O peripheral may provide network connectivity (e.g., an Ethernet port), provide multiple CPU cores, provide hardware acceleration engines, and provide a rich programming environment (i.e., an environment that enhances the integration of independent software components). Moreover, the smart I/O peripheral may provide endpoint connectivity (e.g., provide one or multiple PCIe ports) to an in-band communication channel (e.g., a PCIe link or bus) that is accessible by the host. As a specific example, the components of a PCIe card-based smart I/O peripheral may be mounted on a circuit card substrate that has a PCIe card edge connector that has a form factor to allow the smart I/O peripheral to be installed in a PCIe card slot connector of the server. In accordance with further implementations, a smart I/O peripheral may be constructed to be installed in a card slot connector other than a PCIe card slot connector, and in accordance with yet further example implementations, components of the smart I/O peripheral may be mounted (e.g., surface mounted) to a motherboard of the server.

A cloud-native, segmented compute node that has smart I/O peripherals results in a dual-management control system within the compute node, separating the control of the smart I/O device from the host CPU control by adding a hardware-abstracted interface to the host. The hardware-abstracted interface may be presented to the host as a standard local I/O peripheral (i.e., a non-smart I/O peripheral).

The host may access a smart I/O peripheral (e.g., access a PCIe-based smart I/O peripheral using PCIe direct I/O communications) to map physical functions and virtual functions (e.g., PCIe physical and virtual functions) into host-abstracted application operating environments. The backend I/O services that are provided by the smart I/O peripheral may be fully managed by the smart I/O peripheral independently from the host. Moreover, the lifecycles of these services may be controlled by the smart I/O peripheral independently from the host.

Therefore, a segmented compute node that has a cloud-native infrastructure architecture with hardware abstraction-isolated smart I/O peripherals differs from a non-segmented compute node that has a legacy architecture that is built around a host-centric control. This difference creates an architecture gap in current server designs, for both the pre-boot and runtime environments. The architecture gap presents challenges in orchestrating control, as the host is no longer the root of control.

One approach to address this dilemma and bridge the architecture gap is to modify a legacy server hardware architecture to allow control of the server to be rooted in a service processor of the server. For example, a slot connector (e.g., a PCIe connector) of the legacy server hardware architecture may be modified to support a sideband communication channel with a baseboard management controller, or "BMC." In general, the BMC is a service processor that is constructed to manage the computer platform. With this approach, control is rooted to the BMC, and the traditional role of the BMC is expanded to manage the smart I/O peripheral by communicating management traffic over the sideband communication channel. Another approach to bridge the architecture gap may be to modify the legacy server hardware architecture to include an additional service processor, a platform controller, and root control in the platform controller so that the platform controller supervises both the BMC and the smart I/O peripheral.

The above-described approaches to bridge the architecture gap in a segmented server involve changes to the architectures of next generation servers. Modifying the legacy server hardware architecture to accommodate smart I/O peripherals in next generation servers, however, does not provide a backward compatibility path for existing servers.

In accordance with example implementations that are described herein, a trust domain (called the "cloud tenant domain" herein) of the host of a server is blended with a hardware isolated trust domain (called the "cloud operator domain" herein) of a smart I/O peripheral of the server. This blending ensures that services of the host, which may be offloaded to the smart I/O peripheral, are secured and controlled, both prior to the operating environment becoming operational and after the operating environment is operational. Stated differently, the host software stack, in accordance with example implementations, is blended with the offloaded services. This segue of the host-offloaded services with the host software stack may impact the abstracted application operating environments (e.g., bare metal OS environments, hypervisor-VM environments and OS-container applications), which are supported by the smart I/O peripheral. In accordance with example implementations, a server includes a host supervisory service (or "supervisory service") for each application operating environment.

For a bare metal application operating environment (i.e., an environment in which software has full access to the host CPU and other resources of the physical platform, which are exposed to the software), the server provides a host supervisory service that links the backend I/O services that are provided by the smart I/O peripheral into a single security trust domain to the host space. Moreover, in accordance with example implementations, the bare metal operating system may provide hypervisor and container application operating environments; and the server may provide corresponding host supervisory services for these environments. The host supervisory services provide the ability to compensate for the architecture gap that is created by the opaqueness of the smart I/O peripheral's architecture.

Using host supervisory services to manage smart I/O peripherals may encounter challenges due to the smart I/O peripherals behaving differently from traditional peripherals. As an example, a particular host supervisory service may perform PCIe bus enumeration, and the smart I/O peripheral may be a PCIe card. According to the PCIe standard, a PCIe bus device should respond to a valid configuration request within a one second time limit after the PCIe bus device resets or powers on. If the PCIe bus device does not respond to a valid configuration request within the one second time limit, then traditionally, the PCIe bus device is deemed to have failed.

A smart I/O peripheral, however, may be relatively more complex than a traditional PCIe bus device that does not provide intelligent I/O services. Due to this complexity, a fully functional, PCIe-based smart I/O peripheral may be unable to respond within the one second time limit after the smart I/O peripheral is powered on or is reset. More specifically, unlike traditional PCIe bus devices, a smart I/O peripheral may have a relatively architecture, such as an architecture that includes a complex multi-core processing system and hardware accelerator engines (e.g., cryptography engines and packet inspection engines). The smart I/O peripheral, responsive to a boot, may further be controlled over the network by a domain manager for purposes of determining a physical infrastructure inventory and setting up logical domain connections, such as SDN, SDC and SDS connections. Due to this complexity, the smart I/O peripheral may take a relatively longer time (as compared to a PCIe non-intelligent I/O peripheral) to be ready to respond after the power on or reset of the smart I/O peripheral.

A smart I/O peripheral may also incur a significant, indeterminant delay when configuration changes to the smart I/O peripheral occur, such as changes in which the logical connections are changed or the smart I/O peripheral otherwise makes changes to its backend/O services. For example, the number of processing cores that are assigned to a VM instance may be scaled up; and due to this change, an overlay network connection may be added for a backend I/O service that is used by the VM instance. The addition of the overlay network connection may, for example, involve the smart I/O peripheral configuring or reconfiguring a virtual function that is provided by the smart I/O peripheral. Accordingly, the smart I/O peripheral may incur a relatively long delay before the virtual function is ready to be used.

Accordingly, due to its relative complexity, a smart I/O peripheral may not be able to respond in a manner that is expected for legacy I/O peripherals.

In accordance with example implementations, a smart I/O peripheral provides a ready state indicator, which may be accessed by a host supervisory service, for purposes of the host supervisory service determining whether or not the smart I/O peripheral is ready. In this context, the "readiness" of the smart I/O peripheral, in accordance with example implementations, generally represents whether the smart I/O peripheral is ready to proceed with the host. As examples, the ready state indicator may represent whether or not a configuration space of the smart I/O peripheral is ready to be configured by a host supervisory service. As another example, the ready state indicator may represent whether or not a particular function of the smart I/O peripheral is available.

As a more specific example, in response to a power on or reset of the server, as part of bus enumeration, a host supervisory service may detect the presence of peripherals (e.g., PCIe bus peripherals) and for each detected peripheral, set up a configuration space of the peripheral with the addresses of allocated memory space and/or I/O space. After detecting the presence of the smart I/O peripheral, the host supervisory service may, for example, access a ready state indicator of the smart I/O peripheral for purposes of determining whether or not the smart I/O peripheral is in a state that allows the host supervisory service to proceed with setting up the smart I/O peripheral's configuration space. The host supervisory service may therefore hold setting up of the configuration until the smart I/O peripheral sets the ready state indicator to a represent a ready state, which allows the host supervisory service to proceed.

As another example, a smart I/O peripheral may provide single root-input output virtualization (SR-IOV), which provides sets of virtual functions for corresponding physical functions of the smart I/O peripheral. A hypervisor-based host supervisory service may, for example, responsive to a VM instance activation, place a hold on the VM instance's use of an I/O service that is to be provided by the smart I/O peripheral. As described further herein, the hold on the I/O service may be in place until the smart I/O peripheral sets one or multiple ready state indicators associated with virtual and/or physical functions associated with the I/O service to represent that the function(s) are ready to be used.

Therefore, in accordance with example implementations, the ready state indicators allow host supervisory services to be extended into the cloud operator domain to manage smart I/O peripherals without modifying legacy server architectures and without imposing rigid time constraints that do not take into account the complex natures of the smart I/O peripherals. In accordance with example implementations, extending host supervisory services into the cloud operator domain may involve the vertical integration of host software (e.g., host software that is executed to perform the host supervisory services, smart I/O peripheral hardware, and smart I/O peripheral software). For example, with this vertical integration, the hardware of the smart I/O peripheral may be constructed to manage a register space that stores bits that represent corresponding ready state indicators. A software services stack of the smart I/O peripheral may be constructed to manage the ready state indicators. Extending host supervisory services into the cloud operator domain may include modifying hardware of the smart I/O peripheral (e.g., modifying a register space to store bits representing corresponding ready state indicators). Moreover, extending host supervisory services into the cloud operator domain may include modifying software of the smart I/O peripheral (e.g., modifying a software services stack of the smart I/O peripheral) to manage the ready state indicators.

Referring to FIG. 1, as a more specific example, in accordance with some implementations, a cloud-based computer system 100 that is affiliated with a particular cloud operator may provide multi-tenant cloud services for multiple clients, or tenants. The cloud services may be any of a number of different cloud services, such as Software as a Service (SaaS), Infrastructure as a Service (IaaS), Platform as a Service (PaaS), and so forth. Moreover, depending on the particular implementation, the cloud services may be affiliated with one of several different cloud infrastructures, such as a public cloud that is generally available to all potential users over a public network; a limited access private cloud that is provided over a private network (e.g., cloud services provided by an on-site data center); or a hybrid cloud that is a combination of public and private clouds.

The tenants may access domain nodes 110 (e.g., compute nodes) of the cloud computer system 100 via cloud clients (e.g., laptops, desktop computers, smartphones, tablet computers, wearable computers, and so forth). As depicted in FIG. 1, the domain nodes 110 may be interconnected by physical network fabric 184. In general, the physical network fabric 184 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof. As depicted in FIG. 1, the domain nodes 110 may be interconnected by logical connections 194, such as SDN, SDC and SDS connections.

As also depicted in FIG. 1, a domain node manager 190 (or "node manager 190") may be coupled to the physical network fabric 184 and the logical connections 194. Depending on the particular implementation, the node manager 190 may be located on the domain node 110-1, located on another domain node 110, located on a dedicated administrative node, distributed across multiple nodes of the cloud computer system 100 and so forth. In general, the node manager 190 contains physical hardware resources and logical software resources for managing the domain nodes 110. In accordance with some implementations, the node manager 190 may be associated with a database that stores data pertaining to the domain nodes 110, such as data representing domain node configurations, telemetry logs, audit logs, and so forth. The node manager 190 may include an orchestration engine that manages the operation of leaf managers of the cloud computer system 100 for purposes of controlling the lifecycles and configuring the leaf resources (e.g., smart input/output (I/O) peripherals 180, described herein) of the system 100. In accordance with some implementations, the node manager 190 may communicate intent-based commands (e.g., Redfish commands) with one or multiple vendor root managers (not shown). The vendor root manager contains physical hardware resources and logical software resources to translate the intent-based commands to vendor-specific commands for the leaf resources that are associated with a particular vendor, and these vendor-specific commands may be processed by leaf resource managers (not shown) for the leaf resources. Depending on the particular implementation, the vendor root managers and leaf resource managers may be disposed on one or multiple administrative nodes, may be distributed on one or multiple domain nodes 110-1, and so forth.

The domain node 110-1 may be a computer platform, in accordance with example implementations. In this context, a "computer platform" refers to a unit that includes a chassis and hardware that is mounted to the chassis, where the hardware is capable of executing machine-executable instructions (or "software"). A blade server is an example of a computer platform, in accordance with an example implementation. The computer platform may, however, be a platform other than a blade server, in accordance with further implementations, such as a rack-mounted server, a client, a desktop, a smartphone, a storage array, a laptop computer, a tablet computer, and so forth.

For example implementations in which the computer platform is a blade server, the server may have a frame, or chassis; one or multiple motherboards may be mounted to the chassis; and each motherboard may contain one or multiple multicore central processing unit (CPU) semiconductor packages (or "sockets" or "chips"). In accordance with example implementations, the blade server may have a form factor, mechanical latch(es) and corresponding electrical connectors for purposes of allowing the server blade to be installed in and removed from a corresponding server blade opening, or slot, in rack-mounted blade enclosure.

In accordance with example implementations, the domain node 110-1 may have a cloud-segmented architecture in which smart I/O peripherals 180 of the domain node 110-1 may control different logical connection segments independently from the host of the domain node 110-1. As depicted in FIG. 1, the domain node 110-1 may provide one or multiple application operating environments 120 that are within a cloud tenant domain 111. In general, tenant application instances (e.g., VM instances, container instances, non-virtualized application instances, and so forth) may execute in the application operating environments 120. In general, the application operating environments 120 may represent virtualized environments as well as non-virtualized environments.

As an example, an application operating environment 120 may be an operating system (OS) bare metal environment (an "OS-bare metal application operating environment") that includes application instances that have access to the unabstracted physical resources of the domain node 110-1. As another example, an application operating environment 120 may be an OS-container bare metal application operating environment in which application instances may execute inside container instances. As another example, an application operating environment 120 may be an OS-bare metal/VM environment in which application instances may be execute inside VM instances or outside VM instances. As another example, an application operating environment 120 may be an OS-container bare metal/VM environment in which application instances may execute inside container instances, inside VMs, or outside of a VM or container instance.

In this context, a "virtual machine," or "VM" (also called a "guest virtual machine," a "virtual machine instance," or "a guest virtual machine instance") refers to a virtual environment that functions as a machine level abstraction, or virtual computer system, which has its own physical resources (e.g., CPU(s), system memory, network interface(s) and storage). Moreover, the VM may have its own abstraction of an operating system; and in general, the VM is a virtual abstraction of hardware and software resources of the domain node 110-1. The lifecycle (e.g., the deployment and termination) of the VM may be managed by a virtual machine monitor (VMM), or hypervisor 167, of the domain node 110-1.

A "container" (also called an "instantiated container," "container instance," or "software container"), as used herein, generally refers to a virtual run-time environment for one or multiple applications and/or application modules, and this virtual run-time environment is constructed to interface to an operating system kernel. A container for a given application may, for example, contain the executable code for the application and its dependencies, such as system tools, libraries, configuration files, executables and binaries for the application. In accordance with example implementations, the container contains an operating system kernel mount interface but does not include the operating system kernel. As such, a given computer platform may, for example, contain multiple containers that share an operating system kernel through respective operating system kernel mount interfaces. Docker containers and rkt containers are examples of software containers.

In accordance with example implementations, each application operating environment 120 may have an OS or hypervisor interface 121 (called an "OS-hypervisor interface 121"), and collectively, the OS-hypervisor interfaces 121 may form a tenant workload isolation barrier 197 between the cloud tenant domain 111 and a cloud operator domain 113 of the domain node 110-1. In accordance with example implementations, the cloud tenant domain 111 is considered to be an untrusted domain of the cloud computing system 100, as the domain 111 is associated with cloud tenant software. The cloud operator domain 113 may be considered to be a trusted domain relative to the cloud tenant domain 111.

In accordance with example implementations, the cloud operator domain 113 includes a blended physical and logical infrastructure, including physical hardware and trusted supervisory software components. The components associated with the supervisory services described herein are isolated from tenant workloads by the tenant workload isolation barrier 197 and a tenant workload isolation barrier 198 that is formed by the host interfaces of the smart I/O peripherals 180. For example, the physical hardware components associated with the supervisory services may include one or multiple CPUs 116 and memory components that form a system memory 118. In accordance with example implementations, the system memory 118 and other memories that are discussed herein are non-transitory storage media that may be formed from semiconductor storage devices, memristor-based storage devices, magnetic storage devices, phase change memory devices, a combination of devices of one or more of these storage technologies, and so forth. The system memory may represent a collection of both volatile memory devices and non-volatile memory devices.

The trusted supervisory software components of the cloud operator domain 113 may include, as examples, a hypervisor 167, a basic input/output operating system (BIOS) 165, a Unified Extensible Firmware Interface (UEFI) and an OS 163. As also depicted in FIG. 1, the smart I/O peripherals 180 are within the cloud operator domain 113. The cloud operator domain 113 may, in accordance with example implementations, include one or multiple host supervisory services that are provided by trusted supervisory software component(s). For example, the cloud operator domain 113 may include a pre-boot supervisory service 156 and one or multiple host supervisory services that operate during the post-boot, or runtime, of the domain node 110-1, in accordance with example implementations.

More specifically, in accordance with some implementations, the runtime host supervisory services may include an OS-container runtime supervisory service 150, a hypervisor-VM runtime supervisory service 152 and an OS-bare metal runtime supervisory service 154. In general, as described herein, the host supervisory services may serve a wide variety of purposes for the domain node 110-1, which bridge the architecture gap between the host-centric control model and the cloud-native control model. As examples, the host supervisory services may, in accordance with example implementations, configure the smart I/O peripherals 180; control when holds on I/O services provided by the smart I/O peripherals 180 are released based on ready state indicators that are provided by the smart I/O peripherals 180; provision resources of the smart I/O peripherals 180; provide proof of operating states of the smart I/O peripherals 180; align audit logs for the smart I/O peripherals 180; and so forth.

In accordance with an example implementation, the smart I/O peripheral 180 provides one or multiple ready state indicators (RSIs). An RSI represents a corresponding ready state of the smart I/O peripheral 180 and may be accessed by a host supervisory service for purposes of the service determining a ready state of the smart I/O peripheral 180. As examples, the "readiness" of the smart I/O peripheral 180 may be a readiness of the smart I/O peripheral 180 to be configured by a host supervisory service; a readiness of the smart I/O peripheral 180 to proceed after an I/O service provided by the peripheral or a logical connection created by the peripheral 180 has been changed or created; a readiness of a physical or virtual function of the smart I/O peripheral 180; and so forth.

The RSIs may be RSIs for physical functions and/or virtual functions of the smart I/O peripheral 180. More specifically, in accordance with example implementations, the smart I/O peripheral 180 provides one or multiple physical function RSIs 182, where each physical function RSI 182 represents a ready state of a corresponding physical function (e.g., a PCIe physical function) of the smart I/O peripheral 180. In accordance with example implementations, the smart I/O peripheral 180 may provide one or multiple virtual function RSIs 183, where each virtual function RSI 183 represents a ready state of a corresponding virtual function (e.g., a PCIe virtual function) of the smart I/O peripheral 180.

As described further herein, a host supervisory service may perform one or multiple actions that rely on RSIs that are provided by the smart I/O peripherals 180. For example, a host supervisory service may place a hold on a startup of a VM instance or container instance until an RSI corresponding to a virtual function or physical function for that instance represents that the function is available, or ready. As another example, the host supervisory service may, responsive to an RSI state, place a hold on an instance's use of a particular I/O service that is provided by a smart I/O peripheral while the smart I/O peripheral is reconfiguring the I/O service and release the hold (thereby allowing the instance to use the I/O service) when the RSI state changes to indicate that the I/O service is ready. As another example, a host supervisory service may wait to set up a configuration space of a smart I/O peripheral 180 until an RSI represents that the smart I/O peripheral 180 is ready to proceed with the configuration.

In accordance with some implementations, a host supervisory service may directly read the RSIs from the smart I/O peripherals 180. However, in accordance with further implementations, a service processor of the domain node 110-1, such as a baseboard management controller (BMC) 123, may monitor the RSIs for the smart I/O peripherals 180 and update a register space 128 of the BMC 123 with values representing the RSI states. For example, the register space 128 may include one or multiple registers, where the registered bit fields correspond to different RSIs that indicate respective RSI states. The host supervisory service may, for example, read the BMC register space 128 via a sideband communication channel to determine a given RSI state.

In accordance with some implementations, all error notifications for the domain node 110-1 are directed to the BMC 123. Moreover, the BMC 123, in accordance with example implementations, may receive "hot plug notifications" from the host (e.g., the operating system 163 or hypervisor 167) responsive to corresponding instance changes. A "hot plug notification," as used herein, refers to a notification that a particular backend I/O service of the smart I/O peripheral 180 is to be placed on hold. This hold on the service occurs while the smart I/O peripheral 180 performs a reconfiguration to address the instance change. The BMC 123, in accordance with example implementations, may store data in its register space 128 representing the hold on a particular service that is provided by the smart I/O peripheral 180. As used herein, an "instance change" (or "instance change event") refers to a change that is associated with an instance (e.g., a VM instance or a container instance), which corresponds to a change in one or multiple configurations of a smart I/O peripheral 180. As examples, an instance change may be associated with a configuration change for a virtual function or a physical function of a smart I/O peripheral 180, a startup of an instance, a termination of an instance, an allocation of processing resources (e.g., cores) to an instance, a deallocation of resources for an instance, and so forth.

In accordance with example implementations, in response to an instance change, the host supervisory service may quiesce the instance's use of one or multiple affected I/O services until the smart I/O peripheral makes the configuration changes to address the instance change. As further described herein, in accordance with example implementations, the host supervisory service restores the instance to normal operation (e.g., the hold on the instance's use of the I/O service(s) is released) in response to one or multiple corresponding RSIs representing, or indicating, that the corresponding configuration change(s) of the smart I/O peripheral 180 are in place to allow the execution of the instance to proceed.

In general, as used herein, a "BMC" is a specialized service processor that monitors the physical state of a server, node, or other hardware entity using sensors and communicates with a management system through a management network. The BMC may communicate with applications executing at the operating system level through an input/output controller (IOCTL) interface driver, a representational state transfer (REST) application program interface (API), or some other system software proxy that facilitates communication between the BMC and applications. The BMC may have hardware level access to hardware devices of the hardware entity, including a system memory, local memories, and so forth. The BMC may be able to directly modify the hardware devices. The BMC may operate independently of any operating system instances of the hardware entity. The BMC may be located on a motherboard or main circuit board of the hardware entity. The fact that the BMC is mounted on the motherboard or otherwise connected or attached to the motherboard does not prevent the BMC from being considered "separate" from the processors, which are being monitored/managed by the BMC. As used herein, a BMC has management capabilities for sub-systems of the hardware entity, and is separate from a processing resource that executes an operating system of the computing device.

Regardless of its particular form or implementation, the BMC 123 may include one or multiple embedded processors 124 that execute machine executable instructions 125 (stored in a memory 126 of the BMC 123), for purposes of performing actions by the BMC 123, as described herein. In accordance with example implementations, these actions may include communicating with the smart I/O peripherals 180 for purposes of reading the RSIs 182 and 183. In accordance with example implementations, the BMC 123 may provide one or multiple application programming interfaces (APIs) for reading the RSIs 182 and 183. For example, a host supervisory service may submit an API request to the BMC 123 for a particular RSI value, and the processor 124 of the BMC 123 may, responsive to the API request, read the RSI value and provide the read RSI value in a corresponding API response. In accordance with further implementations, the BMC 123 may regularly read the RSI values and store the RSI values in the register space 128 of the BMC 123. A host supervisory service may, for example, read a particular register bit in the register space 128 to determine a state of a particular RSI. One or multiple processors 124 of the BMC 123 may, in accordance with example implementations, execute machine executable instructions 125 for purposes of receiving and managing hot plug notifications from the host.

The BMC 123 may perform the above-described roles as part of its management plane. The BMC 123 may provide a wide variety of other management services, other than those described above, such as monitoring sensors (e.g., temperature sensors, cooling fan speed sensors); monitoring an operating system status; monitoring power statuses; controlling power on and power off of the computer system; logging computer system events; allowing remote management of the computer system; performing recovery operations after an operating system or computer system failure; and so forth. In accordance with some implementations, the BMC 123 may also have a security plane, in which the BMC 123 performs various security-related functions for the domain node 110-1, such as validating firmware before the firmware is allowed to be loaded and executed by the processor 124; storing, generating and providing cryptographic keys; and so forth.

In accordance with example implementations, the smart I/O peripheral 180 may include one or multiple hardware processing cores 187, which execute instructions 189 stored in a memory 181 of the peripheral 180 for purposes of performing its functions that are described herein. In this manner, in accordance with some implementations, the instructions 189 may be associated with a software stack of the smart I/O peripheral 180. In general, one or multiple processors 187 may execute the software stack for purposes of managing states of the RSIs 182 and 183 and providing one or multiple backend I/O services for the smart I/O peripheral 180. In accordance with example implementations, one or multiple processors 187 may execute the instructions 189 for purposes of performing an example process 600 (FIG. 6) to manage the RSI states. The smart I/O peripheral 180 may further include one or multiple hardware accelerators 175 (e.g., P4 hardware engines) for purposes of performing a wide variety of functions, such as encryption, decryption, packet inspection (e.g., packet inspection for a distributed firewall service), and so forth. It is noted that the smart I/O peripheral 180 may have a variety of different architectures, including components not illustrated in FIG. 1. Among its other components, the smart I/O peripheral 180 may include one or multiple network interface controllers (NICs) 186 that contain corresponding ports (e.g., Ethernet ports) for purposes of communicating with the physical network fabric 184. In accordance with example implementations, the smart I/O peripherals form a network isolation barrier 199 of the domain node 110-1.

As depicted in FIG. 1, in accordance with example implementations, the smart I/O peripheral 180 may include a configuration space 179, such as a PCIe configuration space, that is set up, or configured by, a host supervisory service, as further described herein.

In accordance with some implementations, the smart I/O peripheral 180 includes a register space 177 that contains bit fields that represent respective RSIs (e.g., physical functions RSIs 182 and virtual function RSIs 183). In accordance with example implementations, the register space 177 may be accessible by the host supervisory services (e.g., the register space 177 may be accessible by an in-band communication bus, such as a PCIe bus). In accordance with further implementations, the register space 177 may be accessible by the BMC 123 via a sideband communication bus (e.g., the register space 177 may be accessible by a Serial Peripheral Interface (SPI) bus or an extended SPI (eSPI) bus).

In accordance with some implementations, the register space 177 may store data representing whether the smart I/O peripheral 180 is offline. For example, in accordance with some implementations, one or multiple processors 187 of the smart I/O peripheral 180 may execute instructions 189 to manage the offline indication. More specifically, in accordance with some implementations, an entity (e.g., a CPU 116 or BMC 123) reading the state of an RSI 182 or 183 may acknowledge the reading of the state by writing a corresponding acknowledgment bit (e.g., a bit of the register space 177). This allows the smart I/O peripheral 180 to determine whether or not the peripheral 180 is installed in a platform that uses the RSIs. For example, after the smart I/O peripheral 180 transitions through its power up sequence, the smart I/O peripheral 180 may read an acknowledgement bit corresponding to an RSI (e.g., an RSI corresponding to Primary Function Zero, as discussed further herein) to determine if a state of the RSI state has been read. If, for example, the smart I/O peripheral 180 determines that the state has not been acknowledged and the configuration space 179 of the smart I/O peripheral 180 has not been set up, then the smart I/O peripheral 180 may set an offline bit to indicate that the smart I/O peripheral 180 has taken itself offline.

Figure 3A:
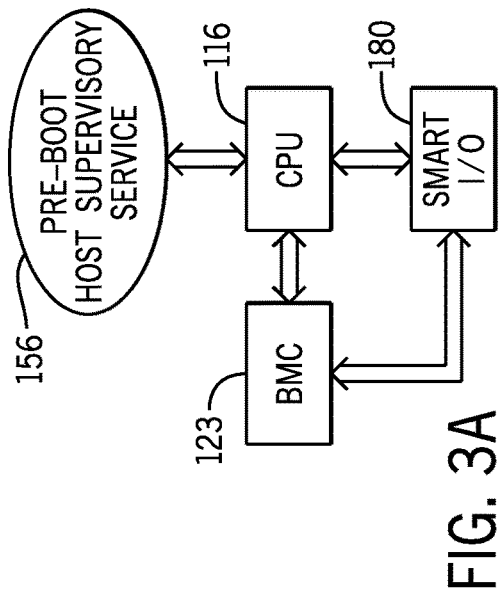
FIGS. 3A, 3B, 3C and 3D are illustrations of example architectures associated with host supervisory services of the domain node according to example implementations.

Referring to FIG. 3A in conjunction with FIG. 1, the pre-boot supervisory service 156 operates during the pre-boot or pre-operating system environment of the domain node 110-1 (i.e., the environment of the domain node 110-1). A CPU 116 may execute BIOS or UEFI instructions to provide the pre-boot supervisory service 156, and providing the pre-boot supervisory service 156 may involve the CPU 116 communicating with the smart I/O peripheral 180 and the BMC 123. The pre-boot supervisory service 156, in accordance with example implementations, may set up the tenant visibility of resources of the domain node 110-1. Resources may be hidden from a tenant for a number of different reasons, such as, for example, the tenant not wanting to pay for the resources, controlling the quality of service (as exposing the resources may affect performance of the domain node 110-1), and so forth. In accordance with some implementations, the pre-boot supervisory 156 may control the visibility of certain physical function(s) and/or virtual function(s) of the smart I/O peripheral 180 accordingly so that the function(s) are not exposed to the node manager 190. The resources that are hidden may be any of a number of different resources, such as devices (e.g., graphics processing units (GPUs), CPUs, NVMe drives, and so forth), memory above a certain capacity, CPU core frequency above a certain limit, and so forth. In general, the pre-boot supervisory service 156 takes and inventory of the logical and physical infrastructure resources; controls the visibility of resources of the domain node 110-1; and sets up the application operating environments 120. The pre-boot supervisory service 156, in accordance with example implementations, searches for the node manager 190 (e.g., the pre-boot supervisory service 156 searches over an encrypted overlay network) and binds the domain node 110-1 to the node manager 190 for control.

As part of performing the pre-boot supervisory service 156, the CPU 116 may, for example, set up a PCIe configuration space of the smart I/O peripheral 116 and determine an operational state of the smart I/O peripheral 116. For example, the CPU 116 may determine whether the smart I/O peripheral 180 is active or offline. As part of the pre-boot supervisory service 156, the CPU 116 may perform other actions, such as setting up the application operating environments 120, aligning audit logs, verifying proof of an operating state, and so forth.

As part of the pre-boot supervisory service 156, the CPU 116 may perform a bus enumeration, (e.g., a PCIe bus enumeration), which includes detecting the presence of smart I/O peripherals 180 and setting up bus configuration space (e.g., a PCIe configuration space) of each detected smart I/O peripheral. As a more specific example, in accordance with some implementations, the smart I/O peripheral 180 may be a PCIe smart I/O peripheral 180, which has a Device 0, Function 0 (called a "Primary Function Zero" herein). The smart I/O peripheral 180 controls a bit value (i.e., a physical function RSI 182) of a control configuration register that is associated with the Primary Function Zero to indicate whether or not the overall smart I/O peripheral 180 is ready to be configured. As further described herein, such a bit value may be useful for PCIe bus enumeration for purposes of a bus enumeration service determining whether to proceed with configuring the smart I/O peripheral 180 after detecting the presence of the smart I/O peripheral 180. In accordance with further implementations, the smart I/O peripheral 180 may provide a physical RSI 182, other than an RSI associated with Primary Function Zero, for purposes of representing or indicating whether the smart I/O peripheral 180 is ready to be configured. As an example, in accordance with some implementations, responsive to the Physical Function Zero RSI representing that the smart I/O peripheral 180 is ready to be configured, the host supervisory service 156 may write to the configuration space of the smart I/O peripheral 180 for purposes of setting up the memory space and/or I/O space for the smart I/O peripheral 180.

Referring to FIG. 2 in conjunction with FIG. 1, due to the relative complexity of the smart I/O peripheral 180, the smart I/O peripheral 180 may not be able to be ready for configuration within a set predetermined time (e.g., the one set PCIe time limit). FIG. 2 depicts a power-up sequence 200 for a smart I/O peripheral 180 in accordance with an example implementation. As shown in FIG. 2, the power-up sequence occurs over a time 204 and involves interaction between the node manager 190 (e.g., a node manager of the cloud's management system) and the smart I/O peripheral. After the power on or reset of the smart I/O peripheral 180, the peripheral 180 undergoes a first phase 204 in which the smart I/O peripheral configures its physical infrastructure. For example, this may involve setting up audit logs, setting up telemetry logs, determining a security health, setting up a working baseline measurement, and so forth. Next, in an SDN configuration phase 208, the smart I/O peripheral 180 sets up its SDN connections of one or multiple overlay networks. This may involve setting up resiliency logs, setting up performance logs, and evaluating a security health. Subsequently, in an SDS configuration phase 212, the smart I/O peripheral 180 may set up SDS connections. The phase 212 may include determining storage capacities, setting up isolations and access, and evaluating a security health. In an SDC phase 216, the smart I/O peripheral 180 may determine a number of instances of virtual cores, determine parameters of virtual memory instances, determining numbers and types of network instances, and evaluating a security health. In accordance with example implementations, at the conclusion of the SDC phase 216, the smart I/O peripheral 180 is ready to be configured by the pre-boot host supervisory service 156. In a subsequent services configuration phase 220 that is depicted in FIG. 2, the smart I/O peripheral 180 may set up one or multiple backend I/O services to be provided by the smart I/O peripheral 180. This set up may include instance deployment and sequencing; setting up instance audit and telemetry logs; setting up instance clusters; setting up failover clusters; setting up instance data replication; evaluating instance certifications and compliance; and so forth.

Figure 4:
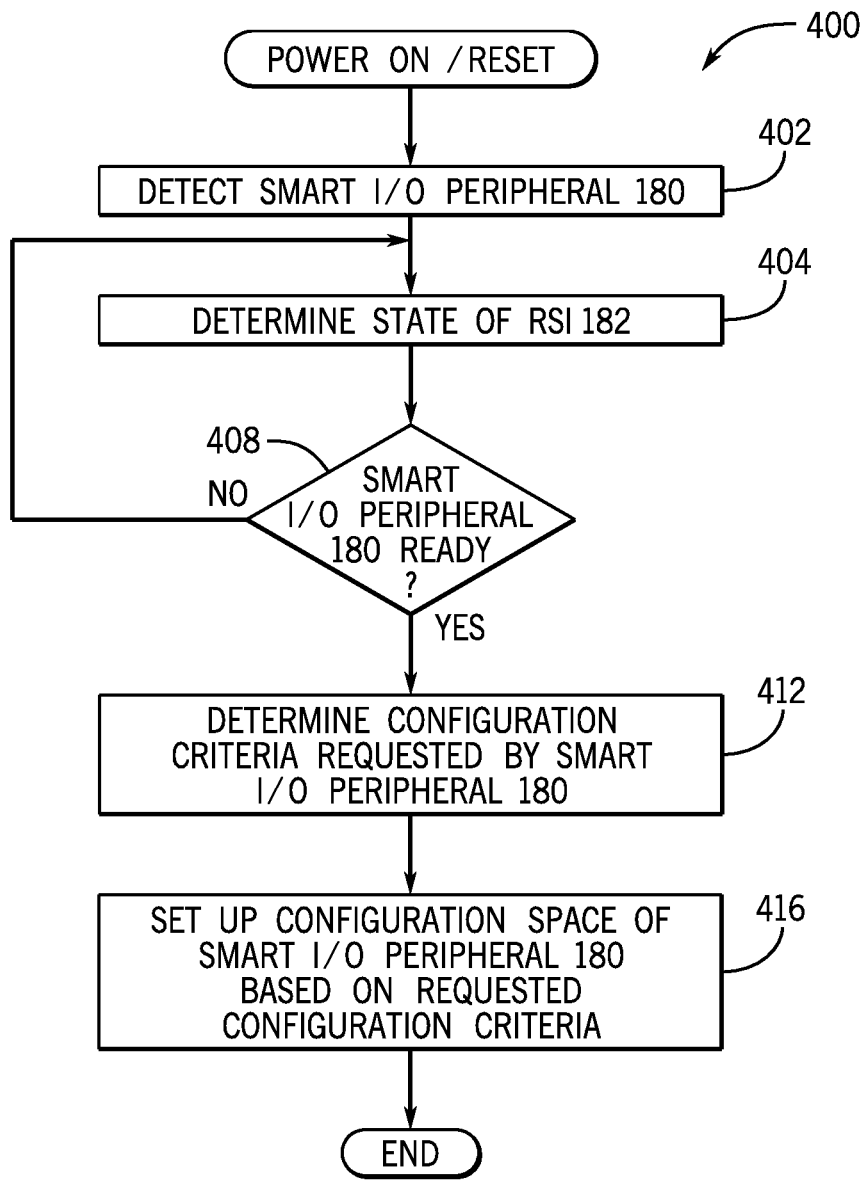
FIG. 4 is a flow diagram depicting a bus enumeration process used by a host supervisory service according to an example implementation.

FIG. 4 depicts a bus enumeration process 400 that may be used by the host supervisory service 156 in response to a power on or reset of the computer platform 110-1. Referring to FIG. 4 in conjunction with FIGS. 1 and 3A, the process 400 may be initiated upon a power on or reset of the domain node 110-1 for purposes of detecting and configuring bus devices. More specifically, in accordance with example implementations, the host supervisory service 156 detects (block 402) the smart I/O peripheral 180.

As an example, in accordance with some implementations, the smart I/O peripheral 180 may be a PCIe bus card. In general, for PCIe bus enumeration, the host supervisory service 156 may attempt to read a vendor identification (ID) and device ID for different bus device, bus number and physical function combinations for purposes of detecting corresponding PCIe bus devices. Here, a "PCIe bus device" refers to a particular PCIe physical function. Because all PCIe cards implement Primary Function Zero (i.e., physical function 0 for device 0), in accordance with example implementations, the host supervisory service 156 may attempt to read a bus device ID and a vendor ID for Primary Function Zero for all bus numbers and bus device numbers for purposes of detecting PCIe bus devices.

In accordance with example implementations, responsive to detecting the smart I/O peripheral 180, the host supervisory service 156 determines (block 404) the state of the physical RSI 182, which corresponds to Primary Function Zero. Based on the state of the RSI 182, the host supervisory service 156 may then determine (decision block 408) whether the smart I/O peripheral 180 is ready to be configured.

More specifically, in accordance with example implementations, the host supervisory service 156 may program, or configure, the configuration space 179 (FIG. 1) of the smart I/O peripheral 180 based on configuration criteria, which the smart I/O peripheral 180 provides via data in the configuration space 179. For example, for implementations in which the smart I/O peripheral 180 is a PCIe card, the smart I/O peripheral 180 may communicate, through Base Address Registers (BARs), of the configuration space 280 corresponding memory criteria for the different corresponding physical functions of the smart I/O peripheral 180. In this manner, the smart I/O peripheral 180 may, for example, for a particular physical function, request the allocation of memory space or I/O space, as well as the particular amount of memory and/or I/O space. When the smart I/O peripheral 180 initially boots up, however, after a power on or reset, the smart I/O peripheral 180 may not be ready for a duration of time to present the requested memory criteria, and the smart I/O peripheral 180 may not be ready for its configuration space 280 to be programmed by the host supervisory service 156. By monitoring the corresponding physical function RSI 182, the host supervisory service 156 may determine when to proceed with the configuration of configuration space 280.

Therefore, upon determining (decision block 408) that the smart I/O peripheral 180 is ready to proceed with the configuration, pursuant to block 412, the host supervisory service 156 communicates with the smart I/O peripheral 180 via the in-band communication channel 211 to determine configuration criteria requested by the smart I/O peripheral 180. Pursuant to block 416, the host supervisory service 156 sets up the configuration space 280 of the smart I/O peripheral 180 based on the requested configuration criteria.

Figure 3C:
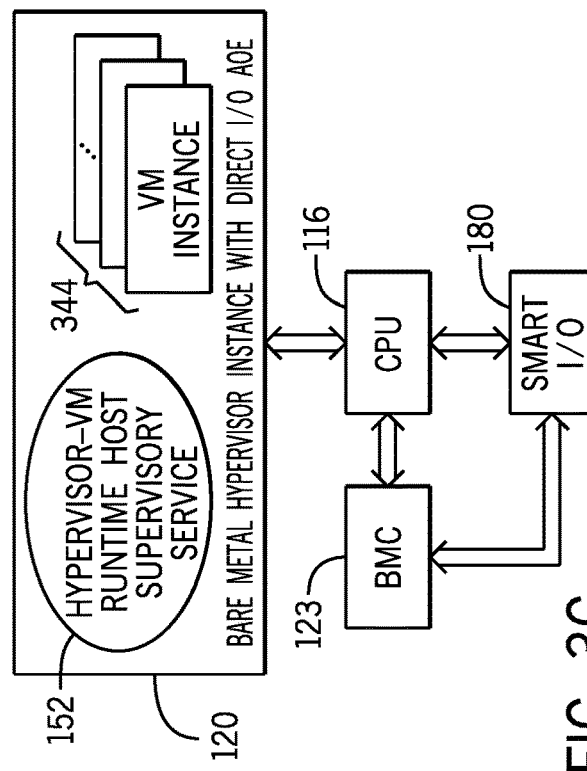
Figure 3B:
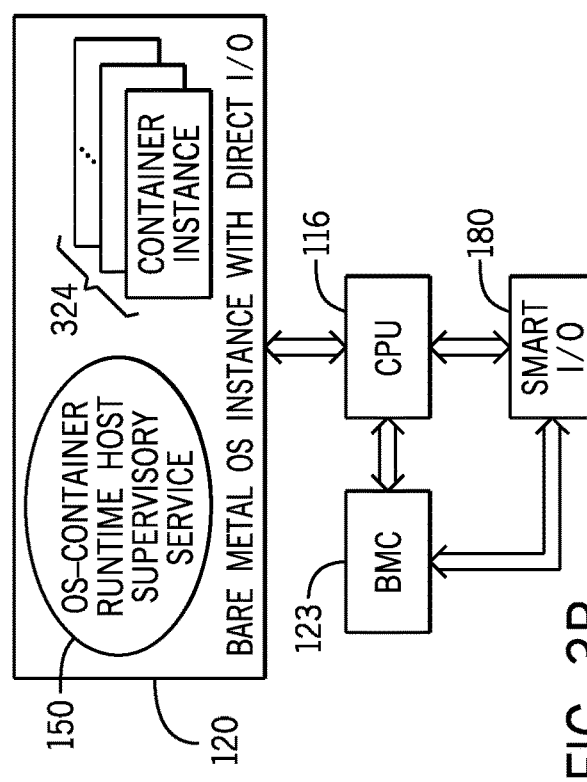

Referring to FIG. 3B, in accordance with example implementations, the host supervisory service 150 may be associated with a bare metal operating system with direct I/O application operating environment 120. For this example, an O/S container runtime host supervisory service 150 may respond to an indication from the BMC 123 that a particular configuration change event has occurred with a container instance 324. In response to the container change event, the host supervisory service 150 may perform a process 500 that is depicted in FIG. 5.

Figure 5:
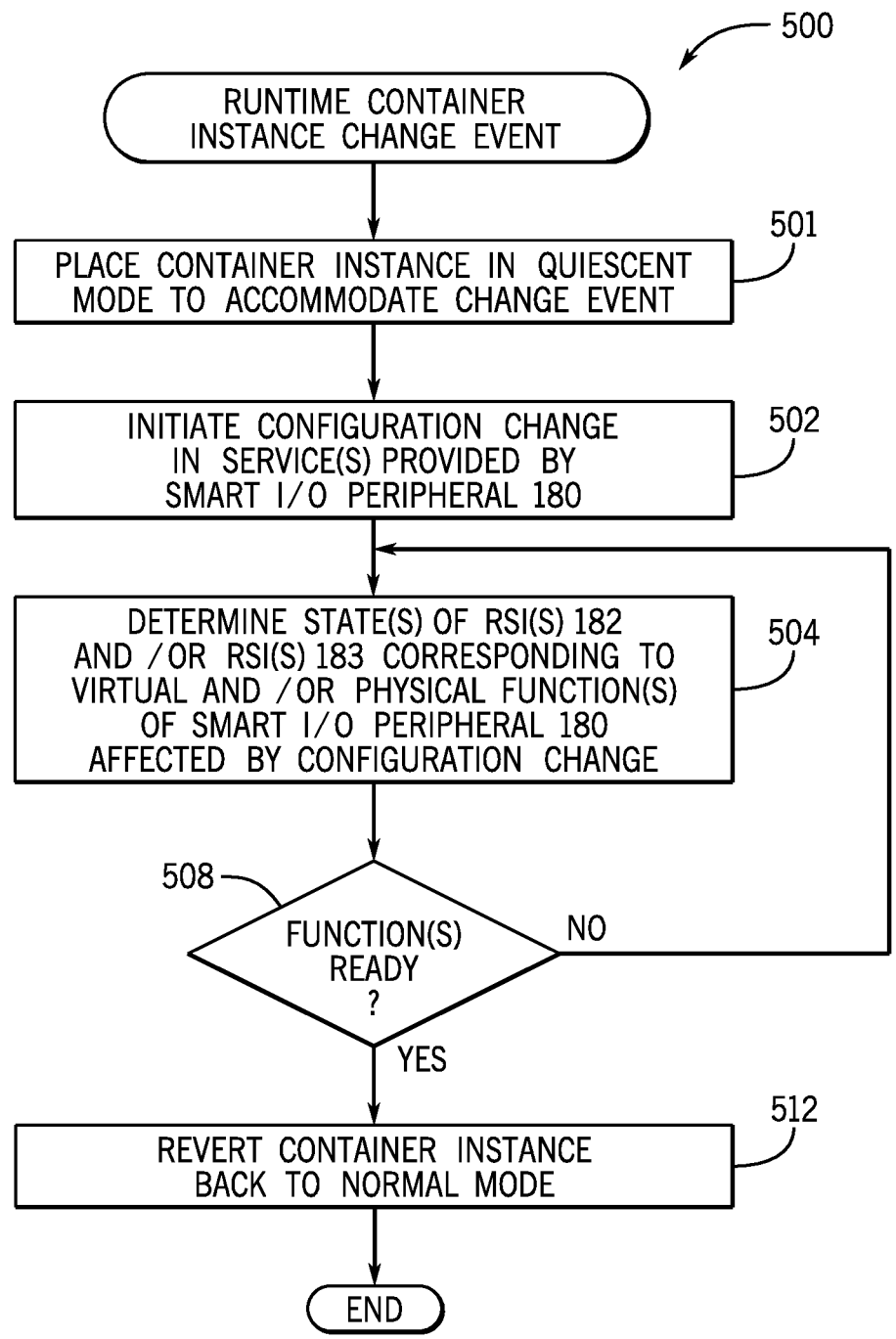
FIG. 5 is a flow diagram depicting a process used by a host supervisory service responsive to a runtime container instance change event according to an example implementation.

Referring to FIG. 5 in conjunction with FIGS. 1 and 3B, the process 500 may be performed in response to a runtime container instance change event, such as, for example, a container instance being created, a container instance ending, more cores being assigned to a container instance, and so forth. These changes may correspond to configuration changes for one or multiple physical or virtual functions of the smart I/O peripheral 180. For example, a particular virtual function may be assigned to a new container instance, a new SDN connection may be set up, an SDN connection may be removed, a virtual function may be reassigned to another container instance, and so forth.

Pursuant to the process 500, the host supervisory service 150 places (block 501) the container instance in a quiescent mode of operation (i.e., quiesces the container instance) to accommodate the change event. In this context, placing the container instance in the quiescent mode of operation refers to quiescing, or silencing, operations of the container instance that are affected by the change event. Stated differently, the quiescing may place the container instance's use of one or multiple I/O services that are affected by the change event on hold. For example, the change event may correspond to a reconfiguration of a particular virtual function of the smart I/O peripheral, and placing the container instance in a quiescent mode of operation may include the halting of the sending of workload transactions to a virtual function and draining, or removing, any outstanding transactions that are waiting for a response from the virtual function. Pursuant to block 502, the host supervisory service 150 communicates with the smart I/O peripheral 180 to initiate a configuration change in one or multiple services that are provided by the smart I/O peripheral 180. To make these changes, the smart I/O peripheral 180 may take an indeterminant amount of time. Accordingly, in accordance with example implementations, the host supervisory service 150 determines (block 504) the state(s) of the corresponding RSI(s) 182 and/or 183 and based on the state(s), determines (decision block 508) whether the changed function(s) are ready. When ready, then, pursuant to block 512, the host supervisory service 150 reverts the container instance back to the normal mode of operation in which the container instance resumes using the function(s) that were affected by the configuration change.

In a similar manner, referring to FIG. 3C, a particular hypervisor-VM runtime host supervisory service 152 may operate in connection with a hypervisor with direct I/O application operating environment 120. In this manner, the host supervisory service 152 may, in response to a configuration change event with a particular VM instance 344, perform a process to quiesce operations of the VM instance 344 that are affected by the configuration change event until the corresponding RSI(s) indicate, or represent, that the corresponding backend I/O service(s) are ready; and when this occurs, the host supervisory service 152 returns the VM instance 344 back to a normal mode. In accordance with further implementations, the hypervisor with direct I/O application operating environment 120 of FIG. 3C may be replaced with kernel-based virtualization environment, such as a kernel-based virtual machine (KVM) that is a module of the Linux kernel.

Figure 3D:
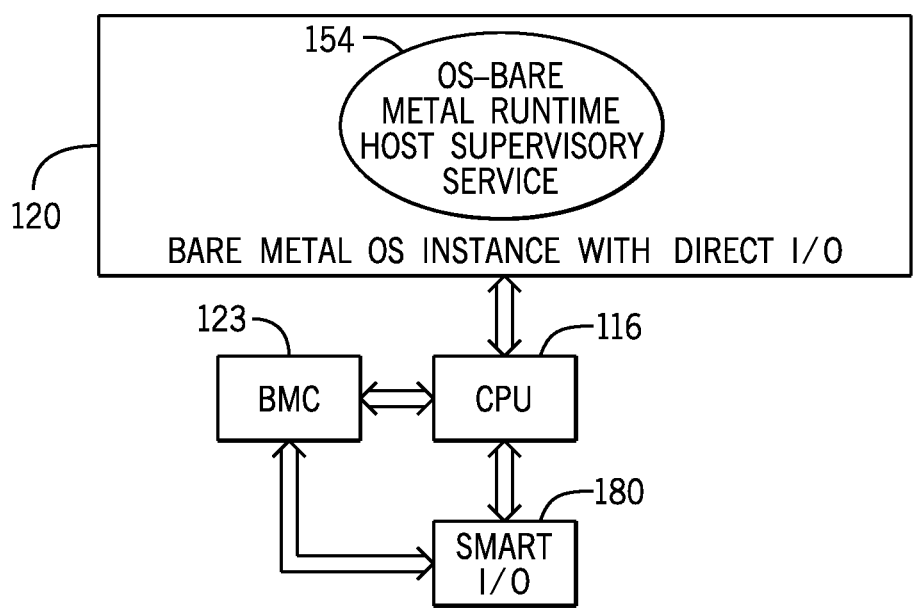

FIG. 3D depicts an OS-bare metal runtime host supervisory service 154 that works in conjunction with a bare metal O/S instance-based operating environment 120. As an example, the host supervisory service 154 may perform BIOS-related and/or UEFI-related configuration services, which use the RSIs that are provided by the smart I/O peripherals 180. For example, in accordance with some implementations, the BMC 123 may receive a hot plug notification in response to a particular card-based smart I/O peripheral 180 being installed in or removed from the domain node 110-1 while the domain node 110-1 is powered on and is in the runtime environment. For this example, the host supervisory service 154 may rely on an RSI of the smart I/O peripheral 180 to setup a configuration space of the peripheral 180, similar to process 400 (FIG. 4). In accordance with example implementations, the host supervisory service 154 may perform other BIOS-related or UEFI-related supervisory services for the smart I/O peripherals 180.

Figure 6:
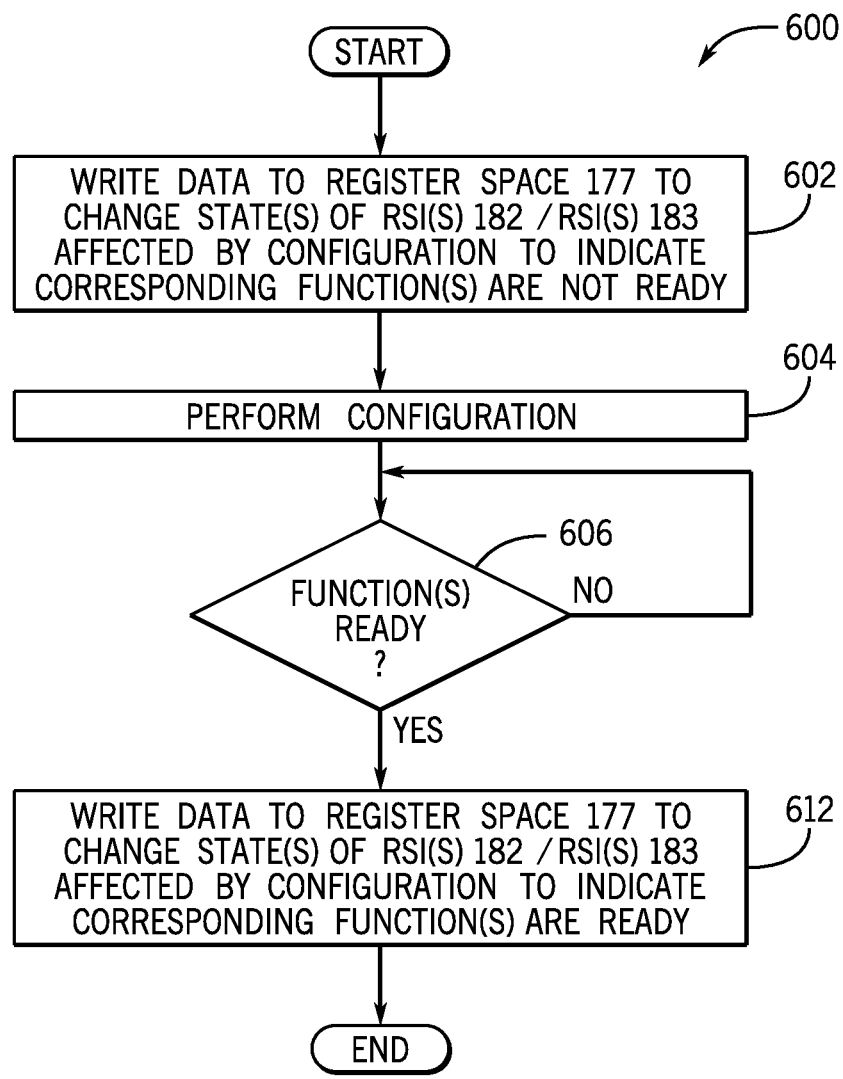
FIG. 6 is a flow diagram depicting a process used by a smart I/O peripheral to manage ready state indicators according to an example implementation.

Referring back to FIG. 1, in accordance with example implementations, one or multiple processing cores 187 of the smart I/O peripheral 180 may execute the instructions 189 for purposes of managing the RSIs 182 and 183 pursuant to a process 600 that is illustrated in FIG. 6. Referring to FIG. 6 in conjunction with FIG. 1, the process 600 may be performed in response to a configuration or re-configuration of logical connections and/or backend I/O services that are provided by the smart I/O peripheral 180. Pursuant to the process 600, the processing core(s) 187 write (block 602) data to the register space 177 to change the state(s) of one or multiple RSIs 182 and/or 183 that are affected by the configuration to indicate that the corresponding physical and/or virtual functions are not ready. The processing core(s) 187 may then perform the configuration, pursuant to block 604. If the processing core(s) 187 determine (decision block 606) that the function(s) are ready, then the processing core(s) 187 writes (block 612) data to the register space 177 to change the RSI state(s) affected by the configuration to indicate that the corresponding function(s) are ready.

Figure 7:
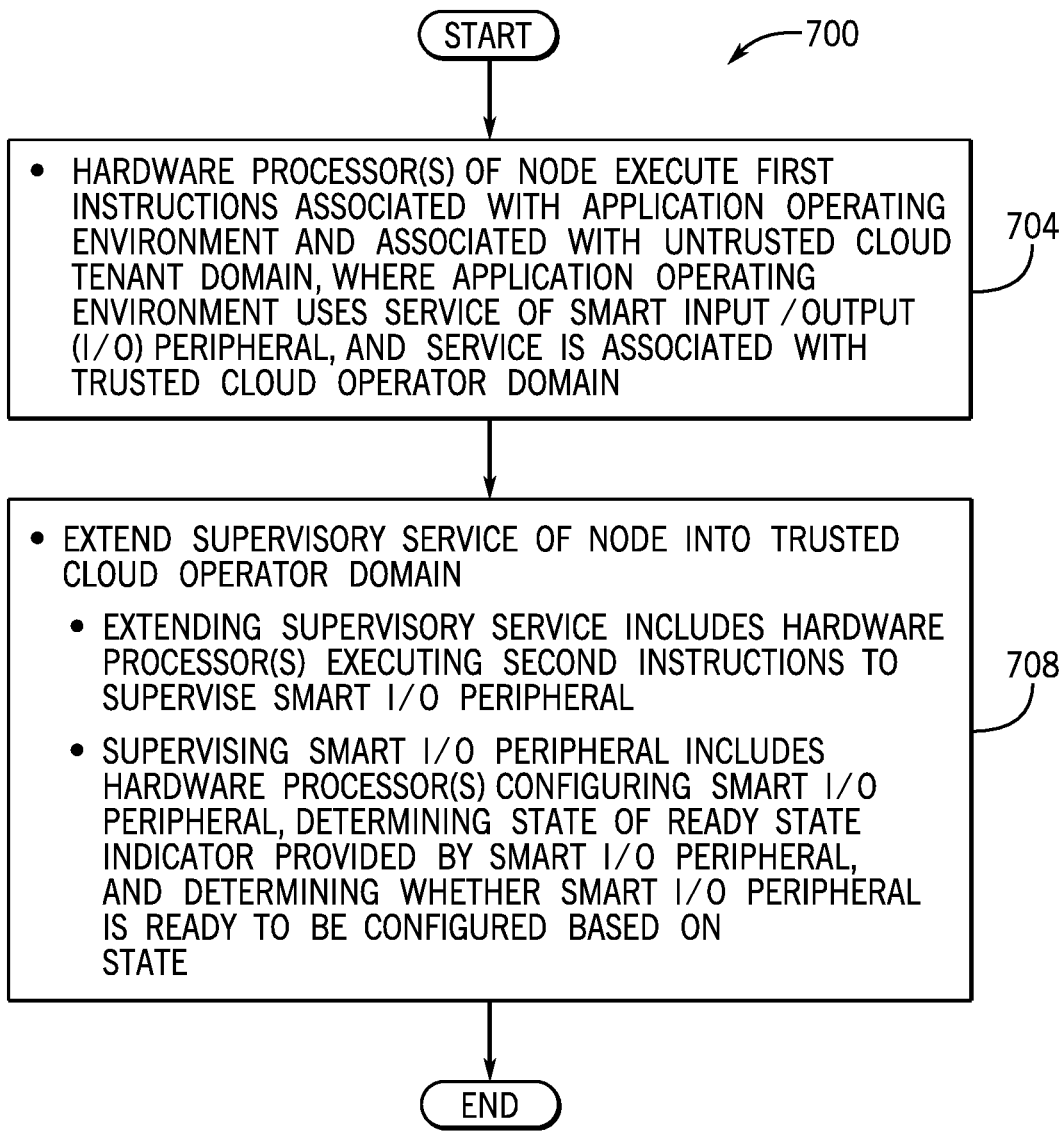
FIG. 7 is a flow diagram depicting a process to extend a supervisory host service into a trusted cloud operator domain according to an example implementation.

Referring to FIG. 7, in accordance with example implementations, a process 700 includes, at least one hardware processor of a host executing (block 704) first instructions associated with an application operating environment and associated with an untrusted cloud tenant domain. The application operating environment uses a service of a smart input/output (I/O) peripheral; and the service of the smart I/O peripheral is associated with a trusted cloud operator domain. The process 700 includes extending (block 708) a supervisory service of the host into the trusted cloud operator domain. Extending the supervisory service includes the hardware processor(s) executing second instructions to supervise the smart I/O peripheral. Supervising the smart I/O peripheral includes the hardware processor(s) configuring the smart I/O peripheral and determining a state of a ready state indicator that is provided by the smart I/O peripheral. Supervising the smart I/O peripheral further includes determining whether the smart I/O peripheral is ready to be configured based on the state.

Figure 8:
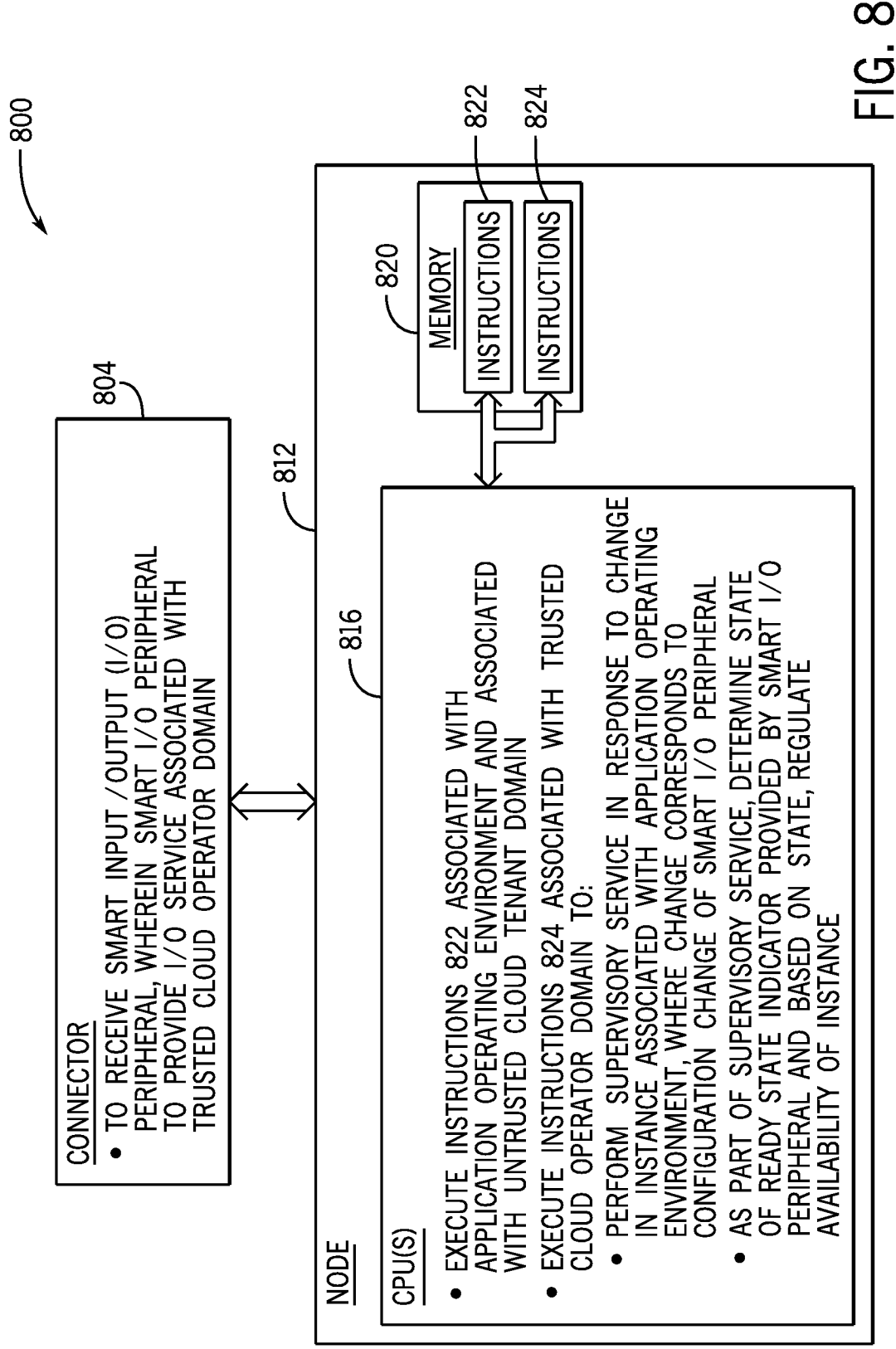
FIG. 8 is a schematic diagram of a system that includes a host to perform a supervisory service for a smart I/O peripheral according to an example implementation.

Referring to FIG. 8, in accordance with example implementations, a system 800 includes a connector 804 and a node 812. The connector 804 receives a smart input/output (I/O) peripheral. The smart I/O peripheral is to provide an I/O service that is associated with a trusted cloud operator domain. The node 812 includes at least one central processing unit (CPU) 816 and a memory 820. The CPU(s) 816 execute instructions 822 that are associated with an application operating environment and associated with an untrusted cloud tenant domain. The CPU(s) 816 execute instructions 824 that are associated with the trusted cloud operator domain to perform a supervisory service for the smart I/O peripheral in response to a change in an instance that is associated with the application operating environment. The change corresponds to a configuration change of the smart I/O peripheral. As part of the supervisory service, the CPU(s) execute the instructions 824 determine a state of a ready state indicator that is provided by the smart I/O peripheral and based on the state, regulate an availability of the instance.

Figure 9:
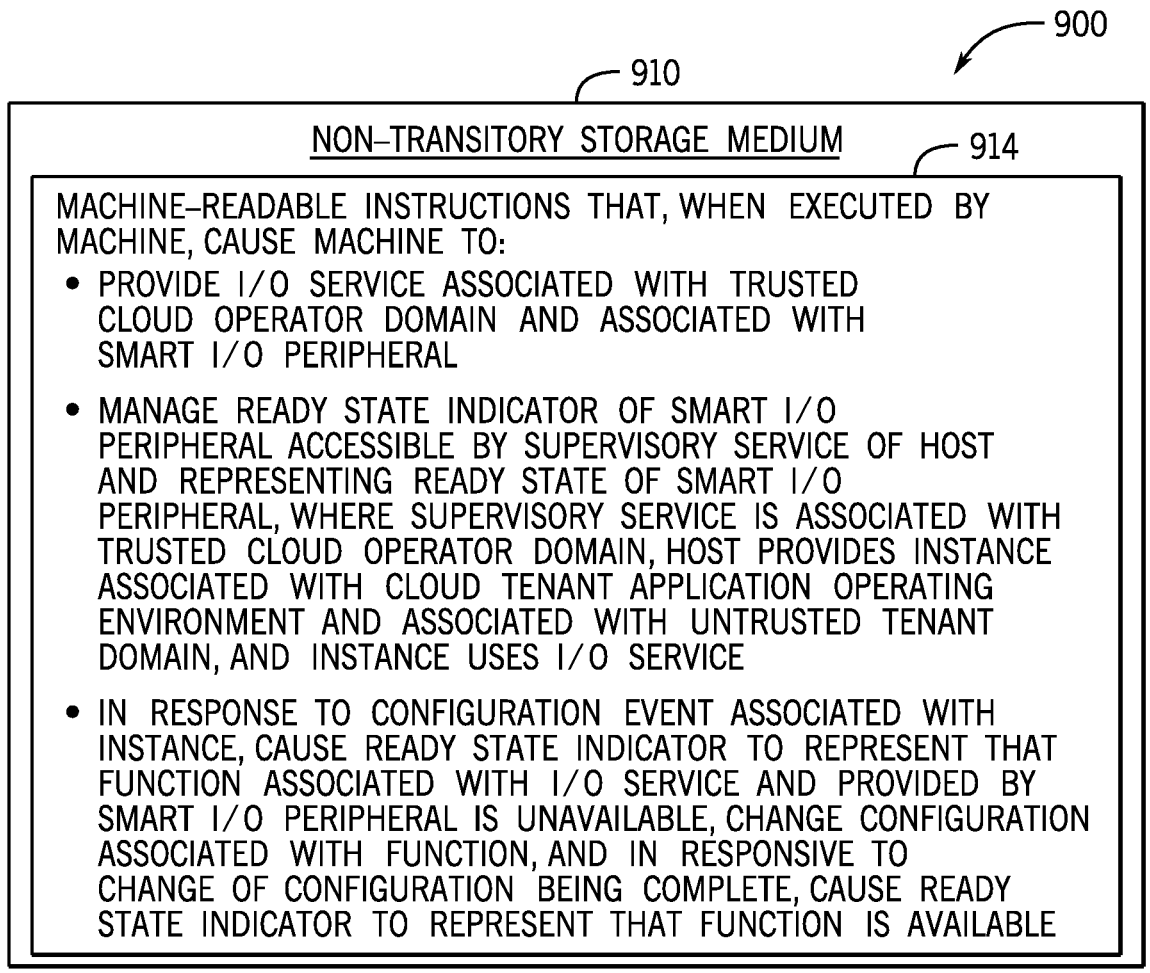
FIG. 9 is an illustration of a non-transitory storage medium that stores machine-readable instructions that, when executed by a machine, cause the machine to manage a ready state indicator of a smart I/O peripheral according to an example implementation.

Referring to FIG. 9, in accordance with example implementations, a non-transitory storage medium 910 stores machine-readable first instructions 914 that, when executed by a machine, cause the machine to provide an input/output (I/O) service that is associated with a trusted cloud operator domain and is associated with a smart I/O peripheral. The instructions 914, when executed by the machine, cause the machine to manage a ready state indicator of the smart I/O peripheral that is accessible by a supervisory service of a host and represents a ready state of the smart I/O peripheral. The supervisory service is associated with the trusted cloud operator domain. The host provides an instance that is associated with an application operating environment and is associated with untrusted cloud tenant domain. The instance uses the I/O service. The instructions 914, when executed by the machine, cause the machine to, in response to a configuration event, cause the ready state indicator to represent that a function that is associated with the I/O service and is provided by the smart I/O peripheral is unavailable. Moreover, the instructions 914, when executed by the machine, cause the machine to change a configuration associated with the function and in response to the change of the configuration being complete, cause the ready state indicator to represent that the function is available.

In accordance with example implementations, the smart I/O peripheral includes a bus device. Configuring the smart I/O peripheral includes setting up a configuration space of the smart I/O peripheral as part of a bus enumeration process. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the smart I/O device includes a bus device that is associated with a primary physical function. Supervising the smart I/O peripheral further includes the supervisory service detecting a presence of the bus device. Determining the state of the ready state indicator includes determining a state of a ready state indicator associated with the primary physical function.

A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, executing the second instructions includes the hardware processor(s) executing at least one of basic input/output system (BIOS) instructions or Unified Extensible Firmware Interface (UEFI) instructions. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the smart I/O peripheral, responsive to powering up or being reset, undergoes a power up sequence, and the ready state indicator corresponds to a delay associated with the power up sequence. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the smart I/O peripheral, in the power up sequence, configures logical connections and a service associated with the logical connections. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the ready state indicator represents whether a configuration change is complete. Responsive to a change in the instance, a hold is placed on use of the I/O service by the instance. Responsive to the state representing that the configuration change is complete, the hold is released. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the change in the instance is a startup of the instance, a termination of the instance or a change in a resource allocation for the instance. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the configuration change is a change affecting at least one of a virtual function of the smart I/O peripheral associated with the instance or a physical function of the smart I/O peripheral associated with the instance. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, a baseboard management controller reads the state of the ready state indicator and provides a representation of the state to the supervisory service. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, a baseboard management controller stores a representation of the state in a register space of the baseboard management controller. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, a baseboard management controller receives a notification of the change in the configuration and notifies the supervisory service responsive to receiving the notification. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the instance is a VM instance. An operating system places a hold on use of the I/O service by the VM instance. Responsive to the state representing that the configuration change is complete, the hold is released. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the instance is a container instance. A hypervisor places a hold on use of the I/O service by the container instance. Responsive to the state representing that the configuration change is complete, the hold is released. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the smart I/O peripheral provides a single root-input output virtualization (SR-IOV), and the change in the configuration corresponds to a virtual function of the SR-IOV. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, a failure by the supervisory service to configure the smart I/O peripheral is detected, and in response to the detected failure, data is stored in a register space of the smart I/O peripheral representing that the smart I/O peripheral is offline. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the configuration event is an event that is associated with a power on or reset of the smart I/O peripheral. A particular advantage, in accordance with some implementations, is that for a segmented domain node having a smart I/O peripheral, an architecture gap between a host-centric control model and a cloud-native architecture may be bridged without modifying a legacy server hardware.

In accordance with example implementations, the configuration event is associated with an instance of an application operating environment of the host. A particular advantage, in accordance with some implementations, is that for a segmented domain node having a smart I/O peripheral, an architecture gap between a host-centric control model and a cloud-native architecture may be bridged without modifying a legacy server hardware.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
at least one hardware processor of a node executing first instructions associated with an application operating environment and associated with an untrusted cloud tenant domain, wherein the application operating environment uses a service of a smart input/output (I/O) peripheral, and the service is associated with a trusted cloud operator domain; and
extending a supervisory service of the node into the trusted cloud operator domain, wherein:
extending the supervisory service comprises the at least one hardware processor executing second instructions to supervise the smart I/O peripheral; and
supervising the smart I/O peripheral includes the at least one hardware processor configuring the smart I/O peripheral, determining a state of a ready state indicator provided by the smart I/O peripheral, and determining whether the smart I/O peripheral is ready to be configured based on the state.

2. The method of claim 1, wherein:
the smart I/O peripheral comprises a bus device; and
configuring the smart I/O peripheral comprises setting up a configuration space of the smart I/O peripheral as part of a bus enumeration process.

3. The method of claim 1, wherein:
the smart I/O device comprises a bus device associated with a primary physical function;
supervising the smart I/O peripheral further comprises the supervisory service detecting a presence of the bus device; and
determining the state of the ready state indicator comprises determining a state of a ready state indicator associated with the primary physical function.

4. The method of claim 1, wherein executing the second instructions comprises the at least one hardware processor executing at least one of basic input/output system (BIOS) instructions or Unified Extensible Firmware Interface (UEFI) instructions.

5. The method of claim 1, wherein the smart I/O peripheral, responsive to powering up or being reset, undergoes a power up sequence, and the ready state indicator corresponds to a delay associated with the power up sequence.

6. The method of claim 5, wherein the smart I/O peripheral, in the power up sequence, configures logical connections and a service associated with the logical connections.

7. A system comprising:
a connector to receive a smart input/output (I/O) peripheral, wherein the smart I/O peripheral to provide an I/O service associated with a trusted cloud operator domain;
a node comprising at least one central processing unit (CPU) and a memory, wherein the at least one CPU to execute first instructions associated with an application operating environment and associated with an untrusted cloud tenant domain, and the at least one CPU to execute second instructions associated with the trusted cloud operator domain to:
perform a supervisory service for the smart I/O peripheral in response to a change in an instance associated with the application operating environment, wherein the change corresponds to a configuration change of the smart I/O peripheral; and
as part of the supervisory service, determine a state of a ready state indicator provided by the smart I/O peripheral and based on the state, regulate an availability of the instance.

8. The system of claim 7, wherein the ready state indicator represents whether the configuration change is complete, and the second instructions, when executed by the at least one CPU further cause the at least one CPU to:
responsive to the change in the instance, place a hold on a function on use of the I/O service by the instance; and
responsive to the state representing that the configuration change is complete, release the hold.

9. The system of claim 7, wherein the change in the instance comprises a startup of the instance, a termination of the instance or a change in a resource allocation for the instance.

10. The system of claim 7, wherein the configuration change comprises a change affecting at least one of a virtual function of the smart I/O peripheral associated with the instance or a physical function of the smart I/O peripheral associated with the instance.

11. The system of claim 7, further comprising:
a baseboard management controller to read the state of the ready state indicator and provide a representation of the state to the supervisory service.

12. The system of claim 11, wherein the baseboard management controller to store a representation of the state in register space of the baseboard management controller, and the second instructions, when executed by the at least one CPU, cause the at least one CPU to access the register space to read the representation.

13. The system of claim 7, further comprising:
a baseboard management controller to receive a notification of the change in the configuration and notify the supervisory service responsive to receiving the notification.

14. The system of claim 7, wherein:
the instance comprises a virtual machine instance; and
the second instructions, when executed by the at least one CPU, cause an operating system to place a hold on use of the I/O service by the virtual machine instance, and responsive to the state representing that the configuration change is complete, release the hold.

15. The system of claim 7, wherein:
the instance comprises a container instance; and
the second instructions, when executed by the at least one CPU, cause a hypervisor to place a hold on use of the I/O service by the container instance, and responsive to the state representing that the configuration change is complete, release the hold.

16. The system of claim 7, wherein the smart I/O peripheral provides a single root-input output virtualization (SR-IOV), and the configuration change corresponds to a virtual function of the SR-IOV.

17. A non-transitory storage medium to store machine-readable instructions that, when executed by a machine, cause the machine to:

provide an input/output (I/O) service associated with a trusted cloud operator domain and associated with a smart I/O peripheral;

manage a ready state indicator of the smart I/O peripheral, wherein the ready state indicator is accessible by a supervisory service of a host and represents a ready state of the smart I/O peripheral, the supervisory services associated with the trusted cloud operating domain, the host provides an instance associated with a cloud tenant application operating environment and associated with an untrusted cloud tenant domain, and the instance uses the I/O service; and in response to a configuration event, cause the ready state indicator to represent that a function associated with the I/O service and provided by the smart I/O peripheral is unavailable, change a configuration associated with the function, and in response to the change of the configuration being complete, cause the ready state indicator to represent that the function is available.

18. The storage medium of claim 17, wherein the instructions, when executed by the machine, further cause the machine to detect a failure by the supervisory service to configure the smart I/O peripheral and in response to the detected failure, store data in a register space of the smart I/O peripheral representing that the smart I/O peripheral is offline.

19. The storage medium of claim 17, wherein the configuration event comprises an event associated with a power on or reset of the smart I/O peripheral.

20. The storage medium of claim 17, wherein the configuration event is associated with an instance of an application operating environment of the host.

* * * * *